United States Patent
Bathurst et al.

(10) Patent No.: US 10,757,113 B2
(45) Date of Patent: *Aug. 25, 2020

(54) COMMUNICATIONS BUS SIGNAL FINGERPRINTING

(71) Applicant: Cylance Inc., Irvine, CA (US)

(72) Inventors: Donald Bathurst, Denver, CO (US); Mark Carey, Worthington, OH (US)

(73) Assignee: Cylance Inc., Irvine, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/462,591

(22) Filed: Mar. 17, 2017

(65) Prior Publication Data

US 2018/0270196 A1 Sep. 20, 2018

(51) Int. Cl.
*H04L 29/06* (2006.01)

(52) U.S. Cl.
CPC ..................... *H04L 63/14* (2013.01)

(58) Field of Classification Search
CPC .......... H04L 63/14; H04L 2012/40125; H04L 2012/4026; H04L 2012/40267; H04L 2012/40273
USPC .......................................................... 726/11
See application file for complete search history.

(56) References Cited

U.S. PATENT DOCUMENTS

| | | | |
|---|---|---|---|
| 5,793,993 A | 8/1998 | Broedner et al. | |
| 6,166,653 A * | 12/2000 | Schulmeyer | G05B 19/042 340/9.16 |
| 6,321,150 B1 * | 11/2001 | Nitta | B60K 6/543 701/32.7 |
| 6,374,173 B1 * | 4/2002 | Ehlbeck | B60K 31/047 701/93 |
| 6,591,821 B1 | 7/2003 | Kong | |
| 8,015,445 B2 * | 9/2011 | Ando | H04L 43/0823 714/25 |
| 9,671,769 B2 * | 6/2017 | Lee | B60W 50/045 |
| 9,881,165 B2 * | 1/2018 | Litichever | G06F 21/6218 |
| 9,892,570 B2 * | 2/2018 | Tornare | G01R 31/54 |
| 9,989,575 B2 * | 6/2018 | Du | H04L 1/24 |
| 10,090,996 B2 * | 10/2018 | Ito | H04L 12/40 |

(Continued)

FOREIGN PATENT DOCUMENTS

JP 2013049399 A 3/2013

OTHER PUBLICATIONS

Wonsuk Choi et al., Identifying ECUs Using Inimitable Characteristics of Signals in Controller Area Networks, www.google.com (Year: 2016).*

(Continued)

*Primary Examiner* — Noura Zoubair
*Assistant Examiner* — Mahabub S Ahmed
(74) *Attorney, Agent, or Firm* — Jones Day

(57) ABSTRACT

Methods are provided herein for communications bus signal fingerprinting. A security module monitors a plurality of voltage lines of at least one electronic control unit (ECU) electrically coupled to a communications bus. A voltage differential across at least two of the plurality of voltage lines of the at least one ECU is measured. The voltage differential is compared to a plurality of predetermined signal fingerprints associated with the at least one ECU. A variance in the compared voltage differential is identified relative to one or more of the plurality of predetermined signal fingerprints. Data characterizing the identified variance is provided.

20 Claims, 6 Drawing Sheets

(56) References Cited

U.S. PATENT DOCUMENTS

| | | | |
|---|---|---|---|
| 10,279,775 B2* | 5/2019 | Shah | H04L 67/12 |
| 10,525,911 B2* | 1/2020 | Haga | B60R 16/0231 |
| 10,581,906 B2* | 3/2020 | Cho | H04L 5/0055 |
| 2004/0049361 A1* | 3/2004 | Hamdan | G01R 31/007 |
| | | | 702/115 |
| 2007/0057648 A1* | 3/2007 | Tsuzuki | H02P 9/48 |
| | | | 322/28 |
| 2008/0238707 A1* | 10/2008 | Grebner | G05B 19/0428 |
| | | | 340/514 |
| 2009/0169007 A1* | 7/2009 | Vasicheck | H04L 63/0428 |
| | | | 380/255 |
| 2009/0200871 A1 | 8/2009 | Luck et al. | |
| 2010/0010698 A1* | 1/2010 | Iwashita | G07F 15/005 |
| | | | 701/22 |
| 2011/0258435 A1 | 10/2011 | Bellur et al. | |
| 2013/0081106 A1* | 3/2013 | Harata | G06F 21/85 |
| | | | 726/2 |
| 2013/0227648 A1* | 8/2013 | Ricci | G06F 21/85 |
| | | | 726/3 |
| 2013/0265686 A1* | 10/2013 | Min | B60L 50/30 |
| | | | 361/91.1 |
| 2014/0032800 A1* | 1/2014 | Peirce | H04L 63/0227 |
| | | | 710/105 |
| 2014/0232521 A1* | 8/2014 | Kawamura | G07C 9/20 |
| | | | 340/5.26 |
| 2014/0359190 A1* | 12/2014 | Metzner | G06F 11/3062 |
| | | | 710/306 |
| 2015/0020152 A1* | 1/2015 | Litichever | H04L 63/0281 |
| | | | 726/1 |
| 2015/0025709 A1 | 1/2015 | Spaulding et al. | |
| 2015/0149083 A1 | 5/2015 | Lee | |
| 2015/0270994 A1 | 9/2015 | Scherr et al. | |
| 2015/0372975 A1* | 12/2015 | Moriya | B61L 15/0018 |
| | | | 726/12 |
| 2016/0142410 A1* | 5/2016 | Mazzara, Jr. | H04L 67/12 |
| | | | 726/4 |
| 2016/0320441 A1* | 11/2016 | Du | G01R 31/52 |
| 2016/0342531 A1* | 11/2016 | Sharma | H04L 63/1408 |
| 2016/0344703 A1* | 11/2016 | Sharma | H04L 63/0428 |
| 2017/0018123 A1* | 1/2017 | Gumpert | G07C 5/08 |
| 2017/0070488 A1* | 3/2017 | Jun | H04L 67/12 |
| 2017/0134164 A1* | 5/2017 | Haga | G06F 8/654 |
| 2017/0144549 A1* | 5/2017 | Park | B60L 58/14 |
| 2017/0163366 A1* | 6/2017 | Aichriedler | H04J 3/0638 |
| 2017/0235698 A1* | 8/2017 | van der Maas | H04L 63/14 |
| | | | 710/106 |
| 2017/0267197 A1* | 9/2017 | Kriger | B60R 21/01546 |
| 2017/0279957 A1* | 9/2017 | Abramson et al. | |
| | | | H04M 1/6075 |
| 2017/0286675 A1* | 10/2017 | Shin | H04L 63/0876 |
| 2017/0318044 A1* | 11/2017 | Dagmi | H04L 63/0227 |
| 2018/0060267 A1* | 3/2018 | Sutton | H04L 67/12 |
| 2018/0091550 A1* | 3/2018 | Cho | H04L 63/1466 |
| 2018/0099643 A1* | 4/2018 | Golsch | G01S 5/04 |
| 2018/0191738 A1* | 7/2018 | David | H04L 63/145 |
| 2018/0203054 A1* | 7/2018 | Romero | G01R 31/52 |
| 2018/0232037 A1* | 8/2018 | Darin | G06F 3/065 |
| 2018/0295147 A1* | 10/2018 | Haga | G07C 5/0808 |
| 2018/0316680 A1* | 11/2018 | Kishikawa | B60R 16/0231 |
| 2019/0007215 A1* | 1/2019 | Hakuta | H04L 63/123 |
| 2019/0245872 A1* | 8/2019 | Shin | H04L 63/1425 |

OTHER PUBLICATIONS

Shreejith et al., Zero Latency Encryption with FPGAs for Secure Time-Triggered Automotive Networks, 2014 IEEE (Year: 2004).*

Murvay et al., Source Identification Using Signal Characteristics in Controller Area Networks, IEEE Signal Processing Letters, vol. 21, No. 4, Apr. 2014 (Year: 2014).*

Yoshikawa et al., Secure in-vehicle Systems using Authentication, International Journal of Networked and Distributed Computing, vol. 3, No. 3 (Aug. 2015), 159-166 (Year: 2015).*

Yoshikawa, et al., Secure in-vehicle systems against Trojan attacks, copyright 2015 IEEE (Year: 2015).*

Matsumoto et al, A Method of Preventing Unauthorized Data Transmission in Controller Area Network, IEEE 2012 (Year: 2012).*

Yu et al., Automobile ECU Design to Avoid Data Tampering, Copyright 2015 ACM 978-1-4503-3345-0/15/04 (Year: 2015).*

Choi, Wonsuk et al., "Identifying ECUs Using Inimitable Characteristics of Signals in Controller Area Networks," Jul. 2, 2016, [online] [retrieved on May 22, 2018] Retrieved from the Internet: <https://arxiv.org/pdf/1607.00497.pdf>.

Patent Cooperation Treaty, International Search Report for International Application PCT/US2018/019699, dated May 31, 2018 (3 pages).

Patent Cooperation Treaty, Written Opinion of the International Searching Authority for International Application PCT/US2018/019699, dated May 31, 2018 (5 pages).

Patent Cooperation Treaty, International Preliminary Report on Patentability for International Application No. PCT/US2018/019699 dated Sep. 26, 2019 (7 pages).

Patent Cooperation Treaty, International Preliminary Report on Patentability for International Application No. PCT/US2018/019706 dated Sep. 26, 2019 (7 pages).

Patent Cooperation Treaty, International Preliminary Report on Patentability for International Application No. PCT/US2018/019692 dated Sep. 26, 2019 (7 pages).

* cited by examiner

//COMMUNICATIONS BUS SIGNAL FINGERPRINTING

BACKGROUND

With the increase in connectivity and data requirements being placed on forms of non-traditional computing platforms, vehicles of different modalities such as planes, trains, motor vehicles, ships, and satellites are exchanging data between themselves and the internet at large. These external communications are known as vehicle-to-vehicle (V2V) communications or vehicle-to-any (V2X) communications. Increase in such communications can pose security risks by exposing the vehicle control networks (VCNs) of these non-traditional computing platforms to potential security breaches and other types of unauthorized access attempts. VCNs having a single point network gateway and/or software based solutions can be susceptible to such security risks remotely. In addition to vehicle applications, there are many other non-vehicle environments which utilize communications buses to send and receive information amongst components within and/or outside. Such applications can range from medical devices to industrial control systems.

SUMMARY

In one aspect, a plurality of voltage lines of at least one electronic control unit (ECU) are monitored. The ECU is electrically coupled to a communications bus. At least one of a motor vehicle, a ship, an airplane, or a train can comprise the communications bus. A voltage differential across at least two of the plurality of voltage lines of the at least one ECU is measured. The voltage differential is compared to a plurality of predetermined signal fingerprints associated with the at least one ECU. Based on the comparing, a variance in the compared voltage differential relative to one or more of the plurality of predetermined signal fingerprints is identified. Data characterizing the identified variance can be provided by causing an alert to trigger, transmitting a fault state message corresponding to the data to the communications bus, causing the blockage of communication between the communications bus and the at least one ECU, or transmitting the data to a remote computing device.

In some variations, during an imprint mode of the at least one security module, a voltage line can be measured. A signal fingerprint associated with one ECU can be determined by comparing the measured voltage line to an ideal voltage associated with the measure voltage line. The signal fingerprint can be provided and stored into memory. The plurality of predetermined signal fingerprints comprises signals of transceiver components of the at least one ECU.

In other variations, the communications bus comprises a serial communications bus. The serial communications bus can be a controller area network (CAN) bus and the at least two of the plurality of voltage lines can be, for example, either a CAN high voltage line or a CAN low voltage line and a ground line.

In some variations, a vehicle control network comprises the communications bus. The vehicle control network can include (i) at least one ECU electrically coupled between the communications bus and a plurality of nodes, (ii) at least one security module electrically coupled between the at least one ECU and the communications bus, and (iii) at least a portion of the communications bus.

In other variations, the monitoring is initiated upon at least one of during operation of the at least one security module, after replacement of the at least one security module, during a loss of clock synchronization of the at least one security module, during a predetermined clock synchronization time window, or after replacement of the at least one ECU.

In some variations, the at least one security module comprises a data processor, a microcontroller, one or more transceivers, a clock, a power regulator, a transmitter, and an analog-to-digital (AD) sampler.

Non-transitory computer program products (i.e., physically embodied computer program products) are also described that store instructions, which when executed by one or more data processors of one or more computing systems, cause at least one data processor to perform operations described herein. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides an un-modifiable trusted hardware unit for the analysis and defense of a connected network that compromised controllers which belong to that network may otherwise be unable to access or affect. This platform can be utilized, for example, by vehicle manufacturers to provide a flexible, modular, and scalable security capability for use across their models without the need to design security solutions for each vehicle platform. Moreover, the security platform can utilize encrypted and signed over-the-air (OTA) or V2X communications methods to allow original equipment manufacturers (OEMs) to change or update the security features and capabilities of the vehicle platform without the need to recall the vehicle or change hardware in depot. Alternatively, there are many other non-vehicle environments which utilize communications buses to send and receive information amongst components within and/or outside, ranging from medical devices to industrial control systems, that can provide for identification of and protection from compromises such as malicious attacks.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to techniques for protecting vehicle control and/or communications equipment and networks from alteration or malicious modification, through hardware and software platforms connected to one or more ECUs. A hardware module can be connected to or embedded on the ECU whereby creating a point for communications centralization and security posture assessment. Such a platform can provide defensive capabilities such as communications encryption, attack detection and prevention, ECU fingerprinting and authentication, message modification prevention, message activity recording, and a next-generation firewall. The platform can also provide awareness of an attack or compromise, control communications from the affected module to the network, and defend other ECUs on the network. In addition, the security platform can be used to monitor human-machine interfaces and third party firmware within the vehicle for integrity and malicious modification, reporting this to the user or external security personnel.

Figure 1:
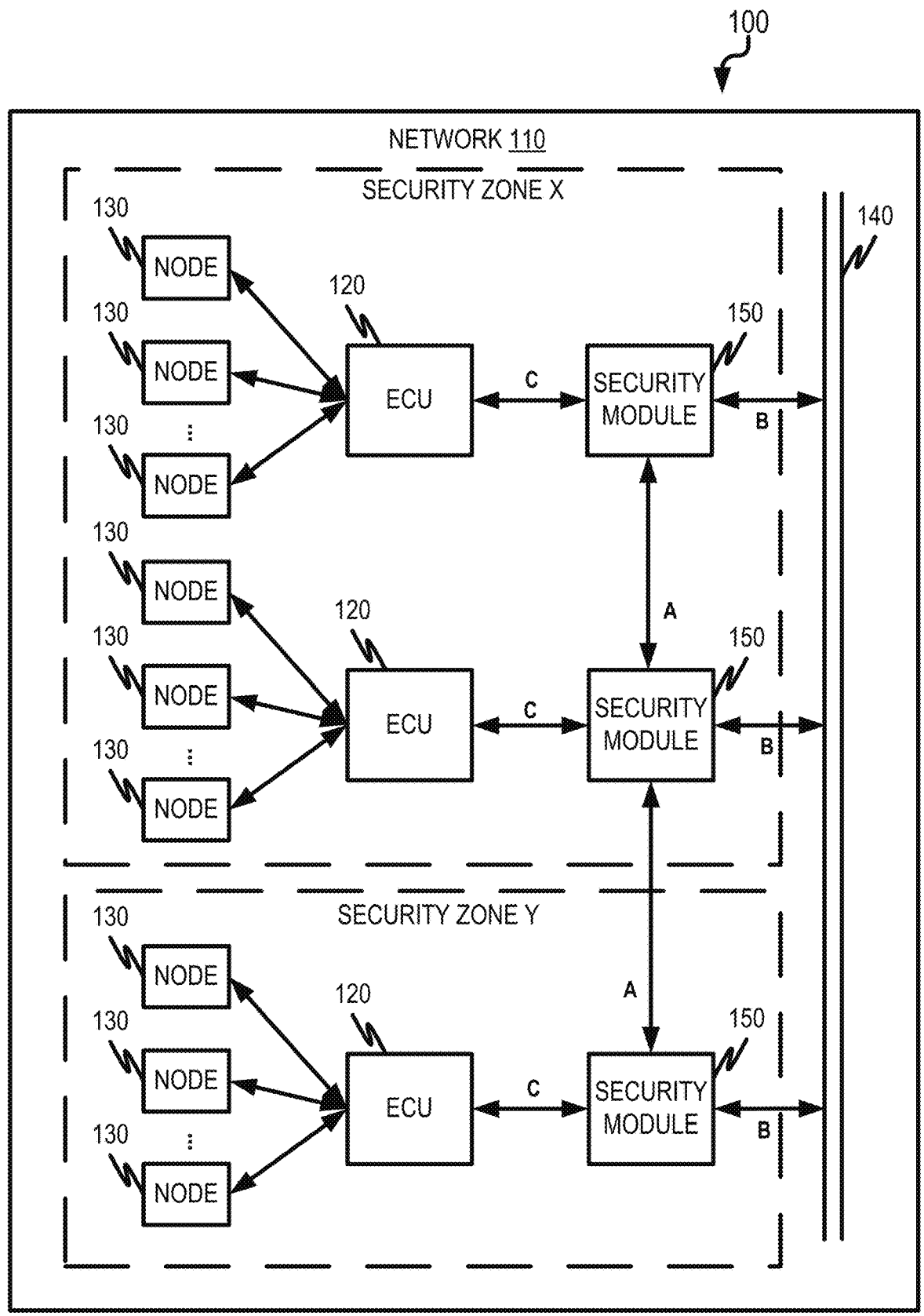
FIG. 1 is a system diagram illustrating an example logical system architecture for use in connection with the current subject matter.

FIG. 1 is a system diagram 100 illustrating an example logical system architecture for use in connection with the current subject matter. A network 110 can include one or more ECUs 120. Each ECU 120 can communicate with one or more nodes 130. Nodes 130 can be, for example, external communication nodes (i.e., Bluetooth, Wi-Fi, Cellular, NFC, etc.), and/or vehicle sensors or actuators within the physical boundaries of the vehicle frame. In addition, a vehicle may also utilize connections to OEM or secondary monitoring services over the Internet via nodes 130. Each ECU can be electrically coupled to a communications bus/network interface 140.

The hardware protection framework can be used for a variety of different applications for protection of a network. One example is in connection with motor vehicles. Modern motor vehicles, for example, utilize an on-board diagnostics (OBD) standard to monitor, control, and/or diagnose a variety of vehicle aspects from engine control to accessory components. A CAN bus is a serial communications network bus used by some motor vehicles that allows for microcontrollers and other devices within the vehicle to communicate with one another.

Security zones can be established to provide a protection framework for one or more ECUs 120 and one or more nodes 130. A single security module 150 can be electrically coupled to a single ECU 120. That single ECU 120 can be connected to one or more nodes 130. A security zone can be established by grouping together multiple security modules 150 having a one to one correlation with a corresponding ECU 120 (i.e., security zone Z). Alternatively, a security zone can be established to include a single security module 150 correlated to a single ECU 120 (i.e., security zone Y). Establishing of security zones can occur during installation of the one or more security modules 150 and can be based on the aspects of the security protection framework.

Message traffic on data bus 140 can be encrypted such that the message security zone origination or destination can be identified. For example, the message traffic along communications bus/network interface 140 can identify if the origin of such traffic is from an ECU 120 belonging to security zone X or alternatively from ECU 120 belonging to security zone Y.

In one variation, security module 150 can be integrated within the ECU (not shown). The physical connection between security module 150 and ECU 120 can differ based on the particular ECU being connected. However, the logical connections between security module 150 and ECU 120 can be uniform across varying ECU types.

Alternatively, in another variation, security module 150 can be an external interposer board electrically coupled external to the ECU 120, between the ECU 120 and communications bus/network interface 140. In this variation, the ECU 120 can be physically disconnected from its communication bus 140 connection as security module 150 has a physical connection between the communications bus/network interface 140 and ECU 120.

One or more security modules 150 can communicate with each other via message traffic along path A. Security modules 150 can communication with communications bus/network interface 140 via path B. Each ECU can communicate with its respective connected security module 150 via path C. The communication between one or more security modules 150 can be an out of band communication along communications bus/network interface 140. Path A indicates a logical connection that is routed over the physical communication bus 140. Cross-communication information (i.e., information decipherable by the security modules) between one or more security modules 150 can be exchanged along path A. Path B represents a physical connection to communications bus/network interface 140. Path C indicates a logical connection between one or more security module 150 and one or more ECUs 120.

Figure 2:
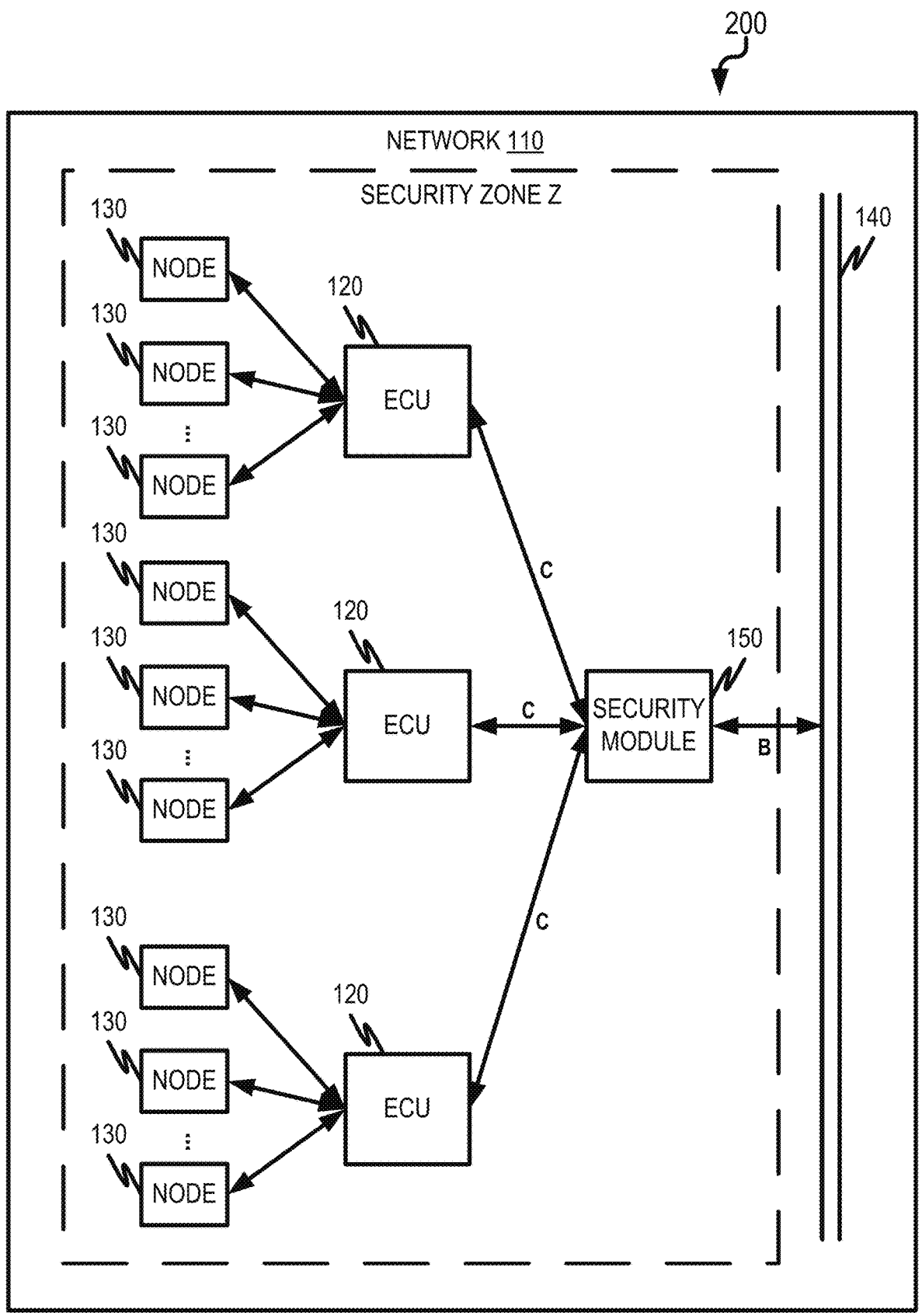
FIG. 2 is a system diagram illustrating another example logical system architecture for use in connection with the current subject matter.

FIG. 2 is a system diagram 200 illustrating another example logical system architecture for use in connection with the current subject matter. In some variations, a single security module 150 can be configured to communicate with multiple ECUs 120 using a cryptographic interface of security module 150. This one to many mapping can form part of a security zone (i.e., security zone Z).

Figure 3:
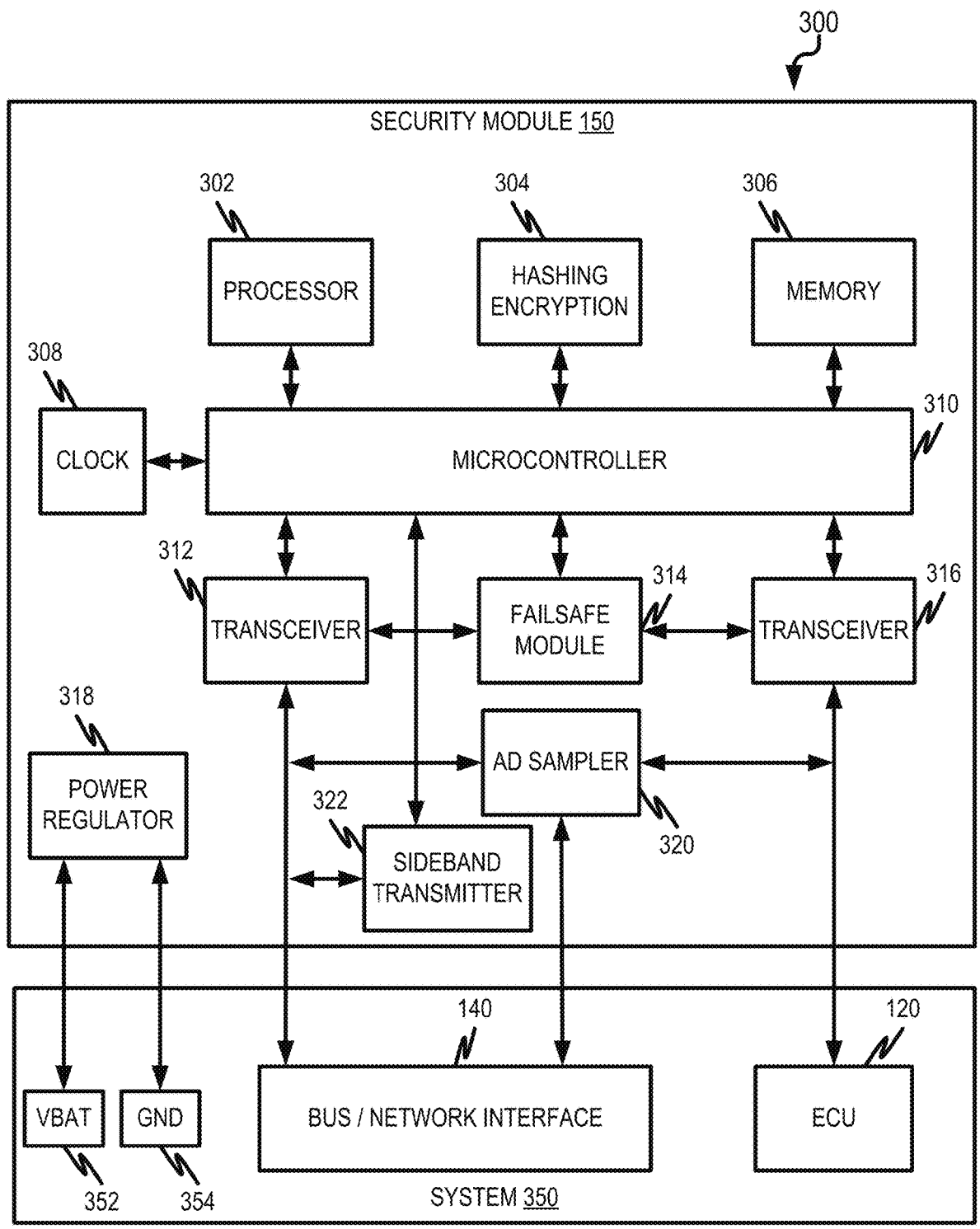
FIG. 3 is a system diagram illustrating a logical integration of security module integration with one ECU of a vehicle.

FIG. 3 is a system diagram 300 illustrating a logical integration of security module 150 with one ECU of a system 350. Security module 150 can include a variety of components which can monitor, interpret, and/or inject data of communications bus/network interface 140. The components of security module 150 can include, for example, a processor 302, a hashing encryption chip 304, a memory 306, a clock 308, a microcontroller 310, one or more transceivers 312, 316, a failsafe module 314, a power regulator 318, a sideband transmitter 322, and an AD sampler 320. Processor 302 can be a general-purpose security processor that can perform calculations and logic operations required to execute operations described herein. A non-transitory processor-readable storage medium, such as memory 306 which can be an encrypted flash memory, can be in communication with the microcontroller 310 and can include one or more programming instructions for the operations specified herein. For example, memory 306 can store one or more signal fingerprints of ECU 120. Programming instructions can be encrypted using hashing encryption chip 304. Hashing encryption chip 304 can also encrypt message traffic along paths A, B, and/or C. Microcontroller 310 can be regulated by clock 308. Clock 308 can be a high-precision clock that is synchronized based on bus initialization or upon determining that synchronization has been lost. A predetermined time synchronization window can be set for clock 308. Microcontroller 310 can also include a memory (not shown) for performing various operations specified herein.

Microcontroller 310 can receive instructions provided by processor 302 in order to operate the one or more transceivers 312, 316. Transceiver 312 can be a CAN transceiver that receives data bus information from communications bus/network interface 140 that is first filtered through an AD sampler 320. The AD sampler 320 can obtain a high-resolution fingerprint of a sending transceiver of one or more ECUs 120. Transceiver 316 can also be a CAN transceiver. Transceiver 316 can be electrically coupled to the ECU 120 and can received data bus information from communications bus/network interface 140 that is first filtered through an AD sampler 320. Transceivers 314, 316 can be discrete and can each communicate with failsafe module 314. Sideband transmitter 322 can communication with microcontroller 310 and transceiver 312.

Some components of security module 150 can be interconnected with system 350. In one example, system 350 can be a vehicle such as a motor vehicle, plane, train, and/or a ship. System 350 can also be any other non-traditional system having a communications bus/network interface 140. System 350 can include communications bus/network interface 140, one or more ECUs 120, can have a battery voltage (VBAT) 352 and a ground (GND) 354. Transceiver 216 can be electrically coupled to ECU 120 in order to exchange message traffic with ECU 120. AD sampler 320 can be electrically coupled to communications bus/network interface 140. Security module 150 can be powered through electrical couplings with system 350. For example, power regulator 318 can be electrically coupled to the battery voltage 352 and grounded by ground 354. As a result, security module 150 can be operative based on the power provided by the system 350.

Figure 4:
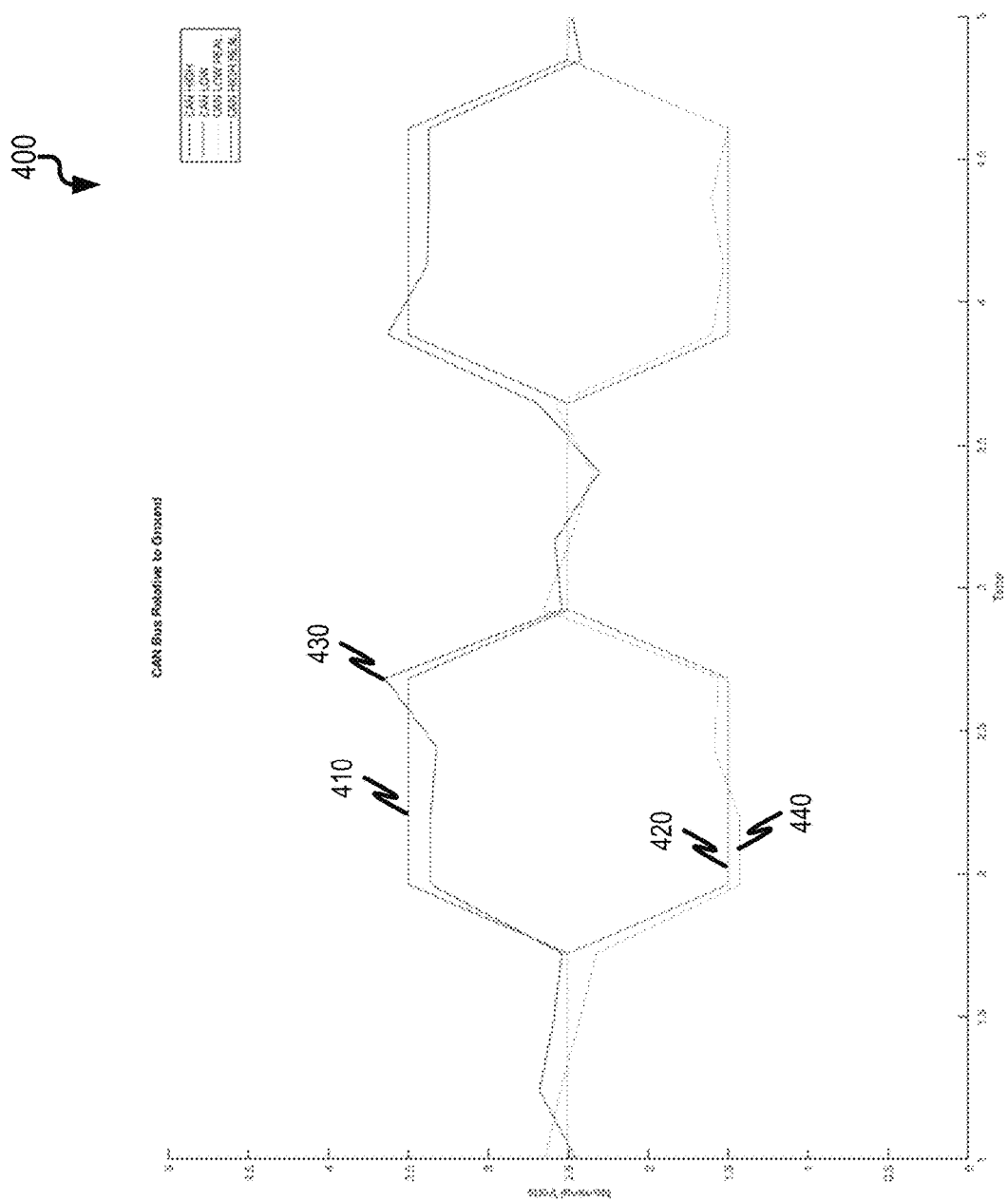
FIG. 4 is an example amplitude versus time plot of an ECU signal fingerprint of a vehicle.

FIG. 4 is an example amplitude versus time plot 400 of an ECU signal fingerprint of a vehicle. For visual purposes only, the time axis (i.e. x-axis) of plot 400 is arbitrary and has no associated units. ECU 120 can include a CAN high voltage line and a CAN low voltage line which are each electrically coupled to a CAN bus (i.e., communications bus/network interface 140). The nominal voltage of an example CAN high voltage line is illustrated as plot line 410. The nominal voltage of an example CAN low voltage line is illustrated as plot line 420. ECU 120 can contain a transceiver which communicates with communications bus/network interface 140. A voltage differential across the CAN high voltage line and the CAN low voltage line relative to a ground line of ECU 120 can be measured to determine a unique transceiver identity. Such a unique transceiver identity can be, for example, of a transmitter within the transceiver. While the ideal model of the CAN bus' signaling is a direct differential voltage separation of either 0 V or 2 V on the CAN high and CAN low lines, each transceiver of one or more ECUs 120 on the communications bus/network interface 140 has unique transmission elements. For example, the transceiver contains electrical components such as resistors and capacitors which have unique electrical characteristics. The excitation phase of the transmission has a unique charge, discharge, and associated waveform characteristics that can be used to generate a signal fingerprinting of the transceivers of each ECU 120 on the communications bus/network interface 140.

Based on tolerance values of the transceiver components, the micro-excitation values are unique within a tolerance of about 5 to 10 percent. The excitation time of a given transceiver is relatively unique on a given communications bus/network interface 140. Signal fingerprints of each transceiver can be defined in terms of signal changes in amplitude relative to time on the communications bus/network interface 140. For a CAN bus application, the CAN bus does not look at these micro-excitation states as they are relatively unique to each transceiver and bus configuration. As a result, these micro-excitation states can be used to identify and determine which transceiver of one or more ECUs 120 is actively transmitting.

Signal fingerprints can be predetermined by security module 150 during an imprint mode. For example, the imprint mode can be entered during replacement of one or more ECUs 120. Security module 150 can measure actual voltages associated with the CAN high (i.e., plot line 430) and CAN low (i.e., plot line 440) voltage lines. As depicted in FIG. 4, comparing the measured voltages of CAN high (i.e., plot line 430) with the ideal voltage associated with the CAN low (i.e., plot line 410), the micro-excitations can be seen as small variances are present in the excitation and drain states. Similar variances can be observed when comparing the measured voltage of the CAN low (i.e., plot line 440) and the ideal voltage of the CAN low (i.e., plot line 420) voltage lines. These variances determine a signal fingerprint and are stored into memory (i.e., memory 306) for later comparisons.

During a monitoring mode, the CAN high and CAN low voltages lines can be continuously monitored while ECU 120 and/or security module 150 is energized. Such monitoring, for example, can be initiated during start-up of a vehicle, during operation of the security module 150, during a loss of clock synchronization of the at least one security module, during a predetermined clock synchronization time window, after replacement of security module 150, or after replacement of ECU 120 once imprint mode has completed. A measured voltage differential across the CAN high and CAN low voltages lines relative to a ground of ECU 120 can be compared to the predetermined signal fingerprint that was measured and stored during imprint mode. Variances within this comparison can identify, for example, that signal transmission between ECU 120 and communications bus/network interface 140 has been compromised (i.e., via an internal or external attack). Based on this compromised determination, security module 150 can block signal transmissions to ECU 120, cause an in-vehicle alert to trigger, transmit a fault state message corresponding to the compromise determination to the communications bus/network interface 140, and/or transmit the compromise determination to a remote computing device.

Data characterizing this variance can be provided in a variety of ways. For example, the data can cause an in-vehicle alert to trigger and/or a fault state message can be transmitted to communications bus/network interface 140. A remote computing device external to the vehicle (i.e., external source monitoring the state of the vehicle) can also be sent data characterizing the variance.

Figure 5:
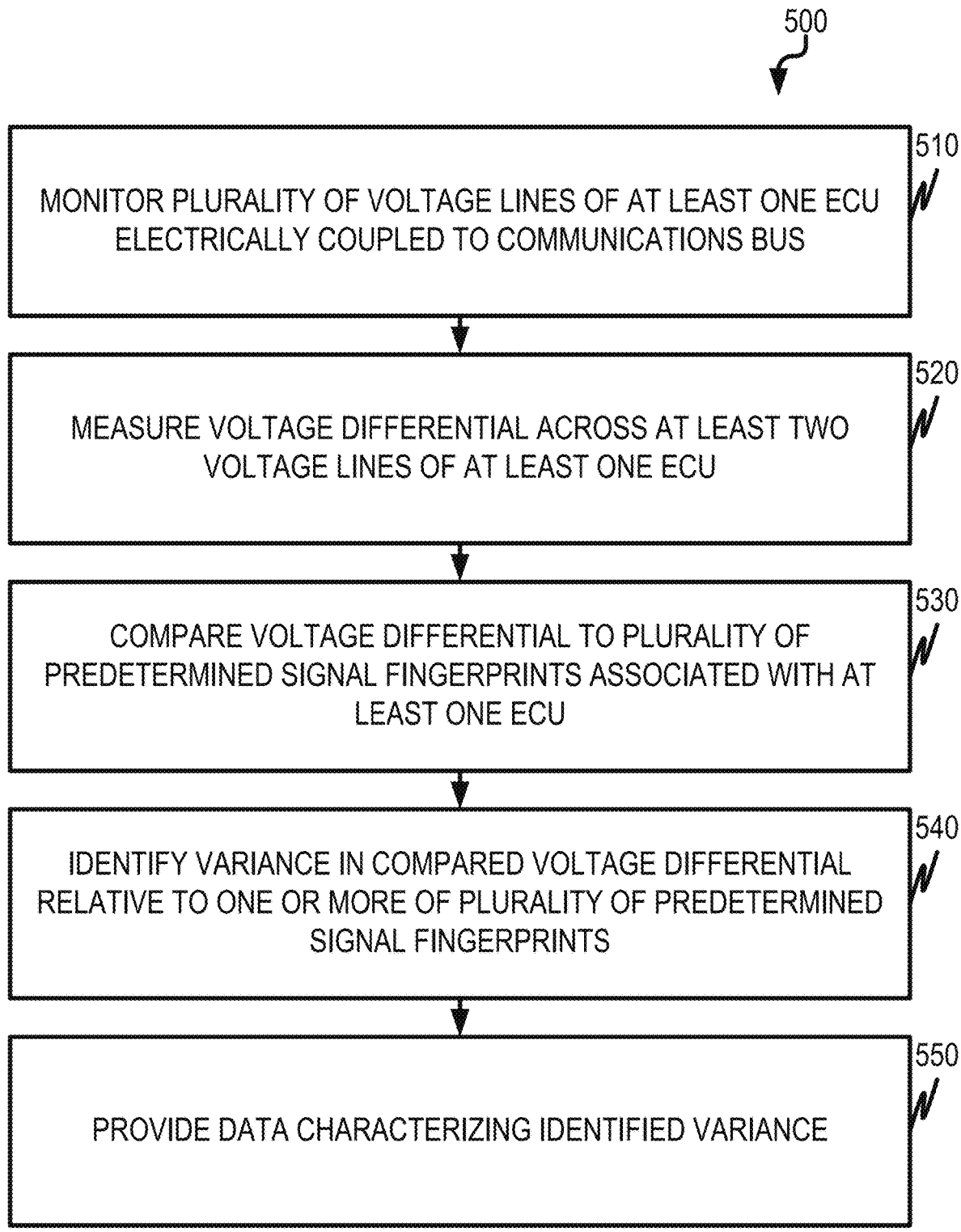
FIG. 5 is an example process flow diagram for monitoring communications signal bus fingerprints.

FIG. 5 is an example process flow diagram 500 for monitoring communications signal bus fingerprints. A plurality of voltage lines of at least one ECU electrically coupled to a communications bus can be monitored, at 510. A voltage differential across at least two of the plurality of voltage lines of at least one ECU can be measured, at 520. One of the at least two voltage lines can include a ground line. The measured voltage differential can be compared, at 530, to a plurality of predetermined signal fingerprints associated with the at least one ECU. A variance in the compared voltage differential can be identified, at 540, relative to one or more of the plurality of predetermined signal fingerprints. Data characterizing the identified variance can be provided, at 550.

Figure 6:
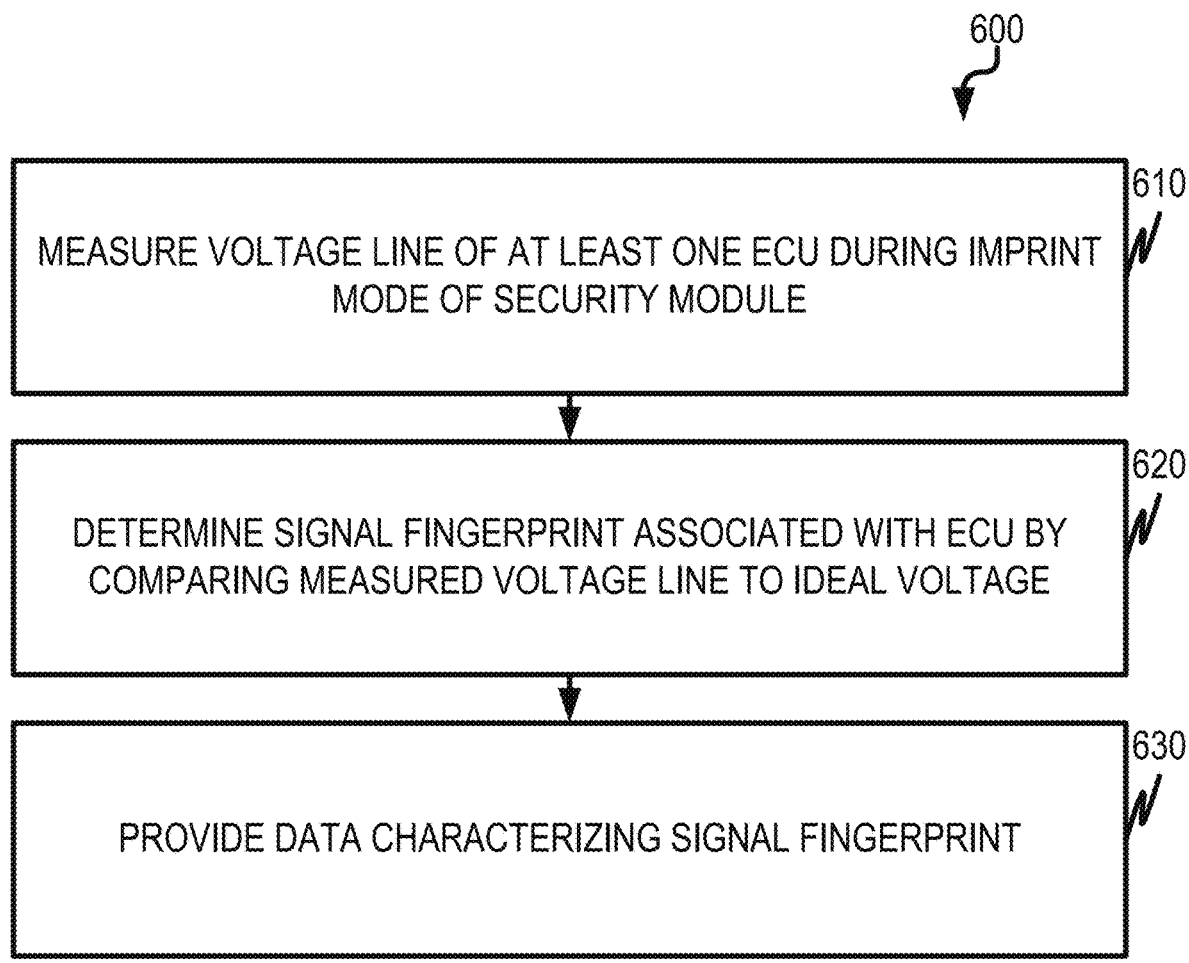
FIG. 6 is an example process flow diagram for communications signal bus fingerprinting.

FIG. 6 is an example process flow diagram 600 for communications signal bus fingerprinting. A voltage line of at least one ECU is measured, at 610, during an imprint mode of the security module. A signal fingerprint associated with the ECU is determined, at 620, by comparing the measured voltage line to an ideal voltage associated with the measured voltage line. Data characterizing the signal fingerprint is provided, at 630.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by a plurality of data processors forming a plurality of computing devices, the method comprising:

monitoring, by a first data processor of a first security module of a first security zone and a second data processor of a second security module of a second security zone, a plurality of voltage lines of a first electronic control unit (ECU) and a second ECU, wherein each ECU is electrically coupled to a communications bus;

measuring, by the first data processor and the second data processor, voltage differentials across at least two of the plurality of voltage lines of the first ECU and at least two of the plurality of voltage lines of the second ECU;

comparing, by the first data processor and the second data processor, each voltage differential to a plurality of predetermined signal fingerprints associated with the first ECU and the second ECU, the plurality of predetermined signal fingerprints representing various voltages over time that characterize nominal operation of the first ECU and the second ECU;

identifying, by at least one of the first data processor or the second data processor and based on the comparing, a variance in at least one of the compared voltage differentials relative to one or more of the plurality of predetermined signal fingerprints, the variance identifying whether signal transmissions on at least one of the plurality of voltage lines has been compromised;

providing, by the at least one of the first data processor or the second data processor, data characterizing the identified variance; and encrypting, by an encryption device, the data characterizing the identified variance, wherein the encrypted data identifies an origination security zone of the data as either the first security zone or the second security zone based on which of the at least one of the first data processor or the second data processor identifies the variance.

2. The method according to claim 1, wherein the providing comprises at least one of: causing an alert to trigger, transmitting a fault state message corresponding to the data to the communications bus, or transmitting the data to a remote computing device.

3. The method according to claim 1, wherein the plurality of predetermined signal fingerprints comprises signals of transceiver components of the first ECU and the second ECU.

4. The method according to claim 1, wherein the communications bus comprises a serial communications bus.

5. The method according to claim 4, wherein the serial communications bus comprises a controller area network (CAN) bus and the at least two of the plurality of voltage lines comprises either a CAN high voltage line or a CAN low voltage line and a ground line.

6. The method according to claim 1, wherein a vehicle control network comprises the communications bus, the vehicle control network comprising (i) the first ECU and the second ECU, each electrically coupled between the communications bus and a plurality of nodes, (ii) the first security module electrically coupled between the first ECU and the communications bus and the second security module electrically coupled between the second ECU and the communications bus, and (iii) at least a portion of the communications bus.

7. The method according to claim 1, wherein the monitoring is initiated upon at least one of: during operation of the security module or the second security module, after replacement of the first security module or the second security module, during a loss of clock synchronization of the first security module or the second security module, during a predetermined clock synchronization time window, or after replacement of the first ECU or the second ECU.

8. The method according to claim 1, wherein each of the first security module and the second security module comprises a data processor, a microcontroller, one or more transceivers, a clock, a power regulator, a transmitter, and an analog-to-digital (AD) sampler.

9. The method according to claim 1, wherein at least one of a motor vehicle, a ship, an airplane, or a train comprises the communications bus.

10. The method according to claim 1, wherein in response to receiving the data characterizing the identified variance, a corrective action is taken.

11. A non-transitory computer program product comprising a computer-readable storage medium having computer-readable program instructions, which when executed result in operations comprising:
monitoring, by a first data processor of a first security module of a first security zone and a second data processor of a second security module of a second security zone, a plurality of voltage lines of a first electronic control unit (ECU) and a second ECU, wherein each ECU is electrically coupled to a communications bus;
measuring, by the first data processor and the second data processor, voltage differentials across at least two of the plurality of voltage lines of the first ECU and at least two of the plurality of voltage lines of the second ECU;
comparing, by the first data processor and the second data processor, each voltage differential to a plurality of predetermined signal fingerprints associated with the first ECU and the second ECU, the plurality of predetermined signal fingerprints representing various voltages over time that characterize nominal operation of the first ECU and the second ECU;
identifying, by at least one of the first data processor or the second data processor and based on the comparing, a variance in at least one of the compared voltage differentials relative to one or more of the plurality of predetermined signal fingerprints, the variance identifying whether signal transmissions on at least one of the plurality of voltage lines has been compromised;
providing, by the at least one of the first data processor or the second data processor, data characterizing the identified variance; and
encrypting, by an encryption device, the data characterizing the identified variance, wherein the encrypted data identifies an origination security zone of the data as either the first security zone or the second security zone based on which of the at least one of the first data processor or the second data processor identifies the variance.

12. The non-transitory computer program product according to claim 11, wherein the providing comprises at least one of: causing an alert to trigger, transmitting a fault state message corresponding to the data to the communications bus, or transmitting the data to a remote computing device.

13. The non-transitory computer program product according to claim 11, wherein the plurality of predetermined signal fingerprints comprises signals of transceiver components of the first ECU and the second ECU.

14. The non-transitory computer program product according to claim 11, wherein the communications bus comprises a serial communications bus.

15. The non-transitory computer program product according to claim 14, wherein the serial communications bus comprises a controller area network (CAN) bus and the at least two of the plurality of voltage lines comprises either a CAN high voltage line or a CAN low voltage line and a ground line.

16. The non-transitory computer program product according to claim 11, wherein a vehicle control network comprises the communications bus, the vehicle control network comprising (i) the first ECU and the second ECU, each electrically coupled between the communications bus and a plurality of nodes, (ii) the first security module electrically coupled between the first ECU and the communications bus and the second security module electrically coupled between the second ECU and the communications bus, and (iii) at least a portion of the communications bus.

17. The non-transitory computer program product according to claim 11, wherein the monitoring is initiated upon at least one of: during operation of the security module or the second security module, after replacement of the first security module or the second security module, during a loss of clock synchronization of the first security module or the second security module, during a predetermined clock synchronization time window, or after replacement of the first ECU or the second ECU.

18. The non-transitory computer program product according to claim 11, wherein each of the first security module and the second security module comprises a data processor, a microcontroller, one or more transceivers, a clock, a power regulator, a transmitter, and an analog-to-digital (AD) sampler.

19. The non-transitory computer program product according to claim 11, wherein at least one of a motor vehicle, a ship, an airplane, or a train comprises the communications bus.

20. A method for implementation by one or more data processors forming one or more computing devices, the method comprising:

measuring, by a first data processor of a first security module of a first security zone and a second data processor of a second security module of a second security zone, a first voltage line of a first electronic control unit (ECU) and a second ECU during an imprint mode of the first security module and the second security module;

determining, by the first data processor and the second data processor, a first signal fingerprint associated with the first ECU and a second signal fingerprint associated with the second ECU over time by comparing the measured first voltage line to a first ideal voltage associated with the first measured voltage line and (ii) the measured second voltage line to a second ideal voltage associated with the second measured voltage line;

providing, by the first data processor and the second data processor, data characterizing the first signal fingerprint and the second signal fingerprint, each signal fingerprint representing various voltages over time that characterize nominal operation of the first ECU and the second ECU; and encrypting, by an encryption device, the data comprising the first signal fingerprint and the second fingerprint, wherein the encrypted data identifies an origination security zone of the data as the first security zone for the first signal fingerprint and the second security zone for the second signal fingerprint.

* * * * *